United States Patent
Hsiao et al.

(10) Patent No.: US 7,593,183 B2
(45) Date of Patent: Sep. 22, 2009

(54) MAGNETIC WRITE HEAD DESIGN FOR REDUCING TEMPERATURE INDUCED PROTRUSION

(75) Inventors: Wen-Chien David Hsiao, San Jose, CA (US); Yimin Hsu, Sunnyvale, CA (US); Edward Hin Pong Lee, San Jose, CA (US); Vladimir Nikitin, Campbell, CA (US); Katalin Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 411 days.

(21) Appl. No.: 11/411,590

(22) Filed: Apr. 25, 2006

(65) Prior Publication Data

US 2007/0247750 A1    Oct. 25, 2007

(51) Int. Cl.
*G11B 5/17* (2006.01)
*G11B 5/147* (2006.01)

(52) U.S. Cl. .................. 360/123.09; 360/123.12
(58) Field of Classification Search .............. 360/125, 360/125.03, 123, 126, 317, 123.02, 123.06, 360/123.09, 123.12; 29/603.07, 603.13
See application file for complete search history.

(56) References Cited

U.S. PATENT DOCUMENTS

| | | | | |
|---|---|---|---|---|
| 6,226,860 | B1 | 5/2001 | Burbank | 29/603.14 |
| 6,603,641 | B1 | 8/2003 | Sasaki | 360/317 |
| 6,728,065 | B2 * | 4/2004 | Batra et al. | 360/125.03 |
| 6,804,879 | B2 | 10/2004 | Hsiao et al. | 29/603.14 |
| 6,989,963 | B2 * | 1/2006 | Kautzky et al. | 360/125.32 |
| 7,174,621 | B2 * | 2/2007 | Sato et al. | 29/603.13 |
| 7,292,408 | B2 * | 11/2007 | Chiu et al. | 360/123.02 |
| 7,322,095 | B2 * | 1/2008 | Guan et al. | 29/603.07 |
| 2003/0137779 | A1 * | 7/2003 | Santini et al. | 360/317 |
| 2004/0051996 | A1 * | 3/2004 | Kautzky et al. | 360/123 |
| 2004/0085684 | A1 | 5/2004 | Basra et al. | 360/317 |
| 2004/0103523 | A1 | 6/2004 | Yamada | 29/603.01 |
| 2005/0024766 | A1 * | 2/2005 | Khera et al. | 360/125 |
| 2005/0024771 | A1 * | 2/2005 | Le | 360/126 |
| 2005/0068673 | A1 * | 3/2005 | Lille | 360/126 |
| 2006/0002021 | A1 * | 1/2006 | Li et al. | 360/126 |
| 2006/0082924 | A1 * | 4/2006 | Etoh et al. | 360/125 |
| 2006/0087765 | A1 * | 4/2006 | Iwakura et al. | 360/125 |
| 2006/0245109 | A1 * | 11/2006 | Hsu et al. | 360/126 |
| 2007/0211378 | A1 * | 9/2007 | Nara | 360/126 |
| 2008/0002290 | A1 * | 1/2008 | Allen et al. | 360/123 |

* cited by examiner

*Primary Examiner*—Brian E Miller
(74) *Attorney, Agent, or Firm*—Zilka-Kotab, PC (57) ABSTRACT

A magnetic write pole having a structure that prevents thermally induced pole tip protrusion. The write head has a return pole with a magnetic pedestal formed at the air bearing surface (ABS) and a back gap at an end opposite the ABS. An electrically conductive write coil having a plurality of turns passes over the return pole. A fill layer of a material having a low coefficient of thermal expansion, such as alumina is disposed between the coil and the pedestal, and may extend over the top of the coil to the back gap. A photoresist coil insulation layer may be provided between the turns of the coil to insulate the turns of the coil from one another. The photoresist coil insulation layer can also extend to the back gap. A write pole, formed above the return pole and coil is magnetically connected with the back gap layer and return pole by a magnetic shaping layer.

15 Claims, 8 Drawing Sheets

MAGNETIC WRITE HEAD DESIGN FOR REDUCING TEMPERATURE INDUCED PROTRUSION

FIELD OF THE INVENTION

The present invention relates to magnetic data recording, and more particularly to a method and structure for preventing thermally induced pole tip deformation in a magnetic write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally has included a coil layer embedded in one or more insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In current read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

More recently researchers have focused on the development of perpendicular magnetic recording systems in order to increase the date density of a recording system. Such perpendicular recording systems record magnetic bits of data in a direction that is perpendicular to the surface of the magnetic medium. A write head used in such a system generally includes a write pole having a relatively small cross section at the air bearing surface (ABS) and a return pole having a larger cross section at the ABS. A magnetic write coil induces a magnetic flux to be emitted from the write pole in a direction generally perpendicular to the plane of the magnetic medium. This flux returns to the write head at the return pole where it is sufficiently spread out and weak that it does not erase the signal written by the write pole.

In order to meet the ever increasing demand for improved data rate and data capacity, researchers are constantly seeking ways to make read and write heads smaller while increasing the write field produced by such write heads. Increasing the write field requires increasing the current flow through the write coil. Decreasing the size of the write head requires decreasing the size of the write coil (decreasing the cross sectional area of the turns of the coil) which increases the electrical resistance of the coil.

This decrease in size and increase in write current greatly increases the amount of heat generated by the write head during use. This heat causes unwanted thermal expansion of the write head, which can result catastrophic deformation of the write head structure. This deformation is especially problematic in current and future magnetic heads, where the fly height of the head is exceedingly small, on the order of nanometers. The thermal protrusion of the write head, combined with these low fly heights can result in catastrophic head disk contact during use. Therefore, there is a strong felt need for means for avoiding such thermally induced deformation of the write head in a small, high power write head.

SUMMARY OF THE INVENTION

The present invention provides a magnetic write head for perpendicular magnetic recording that is resistant to thermally induced deformation. The write head has a write pole and return pole each having an end disposed at an air bearing surface (ABS). A magnetic pedestal is formed at the ABS end of the return pole and extends toward the write pole. An electrically conductive write coil having a plurality of coil turns passes over the return pole, and a non-magnetic, electrically insulating fill material fills the space between the write coil and the pedestal. The fill material is constructed of a material having a low coefficient of thermal expansion, such as alumina.

A photoresist coil insulation layer can be provided between the turns of the coil to insulate the turns of the coil from one another. The head also may include a back gap formed at an end of the return pole that is away from the ABS. The magnetic back gap layer can be magnetically connected with the write pole by a magnetic shaping layer.

The photoresist coil insulation layer can extend between the coil and the back gap layer, and the non-magnetic, electrically conductive, low thermal expansion fill layer can extend over the write coil and coil insulation layer, and may extend to the back gap layer.

The fill layer, having a low coefficient of thermal expansion, advantageously does not press against and deform the pedestal when heated, such as by Joule heating from the write coil. For example, photoresist has a much larger coefficient of thermal expansion than alumina. If a photoresist insulation layer were allowed to fill the space between the coil and the pedestal, this photoresist would expand when heated and would press against the pedestal causing plastic deformation of the pedestal and causing the pedestal to protrude toward the disks, possibly leading to head disk contact and otherwise adversely affecting the performance of the write head. The present invention, therefore, prevents such thermally induced deformation ensuring excellent write head performance and reliability.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
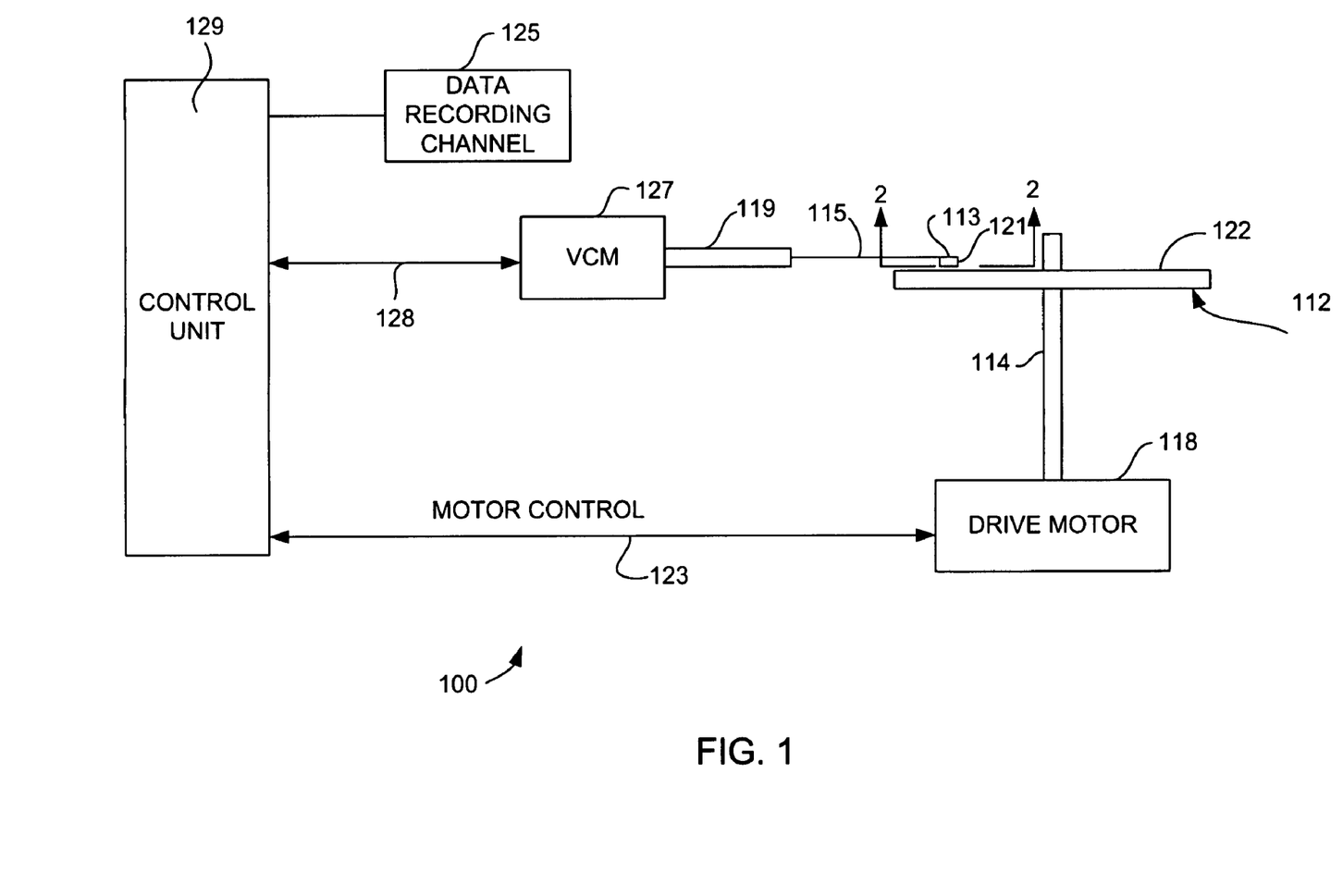
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
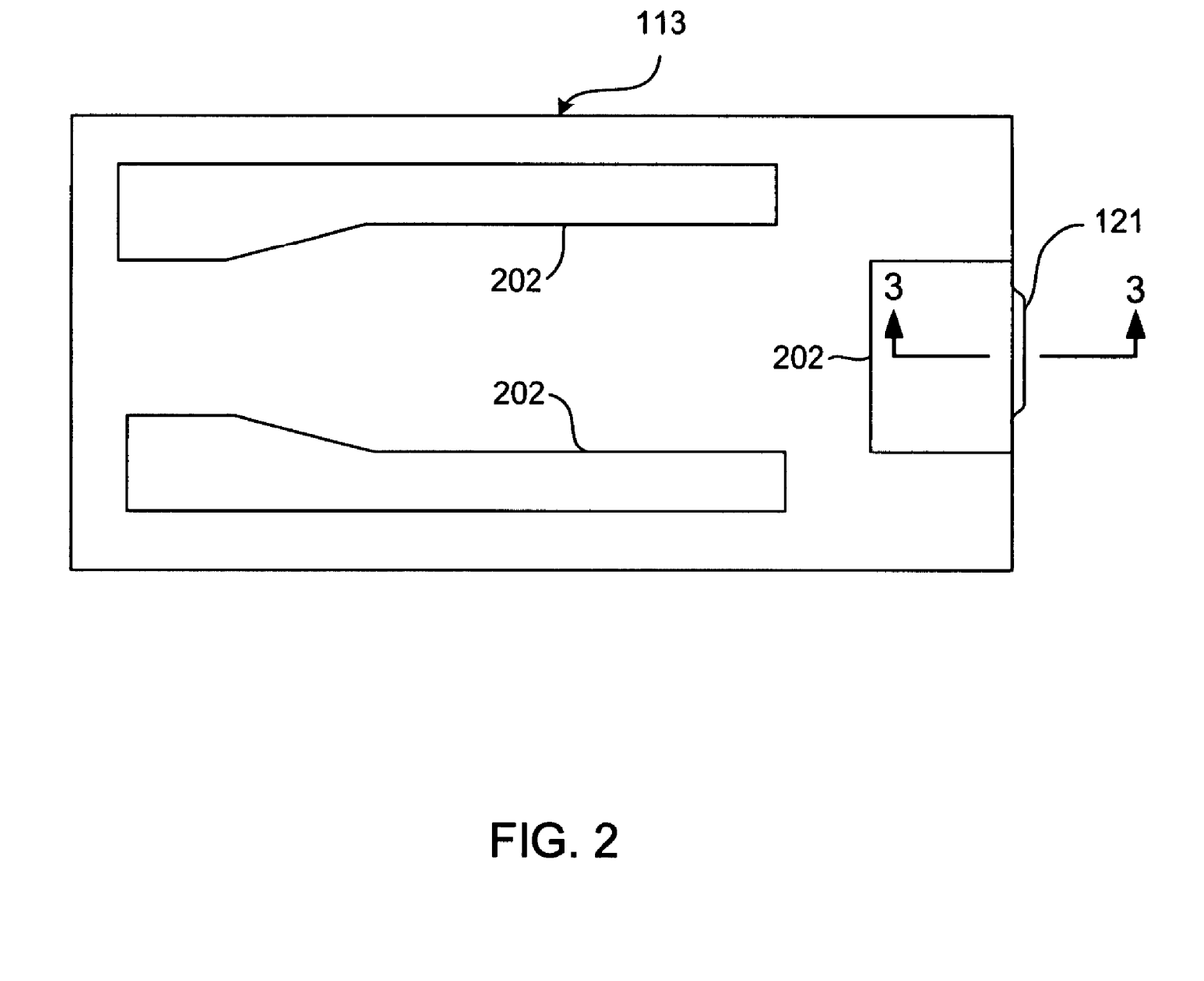
FIG. 2; is an ABS view of a slider, taken from line 2-2 of FIG. 3, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
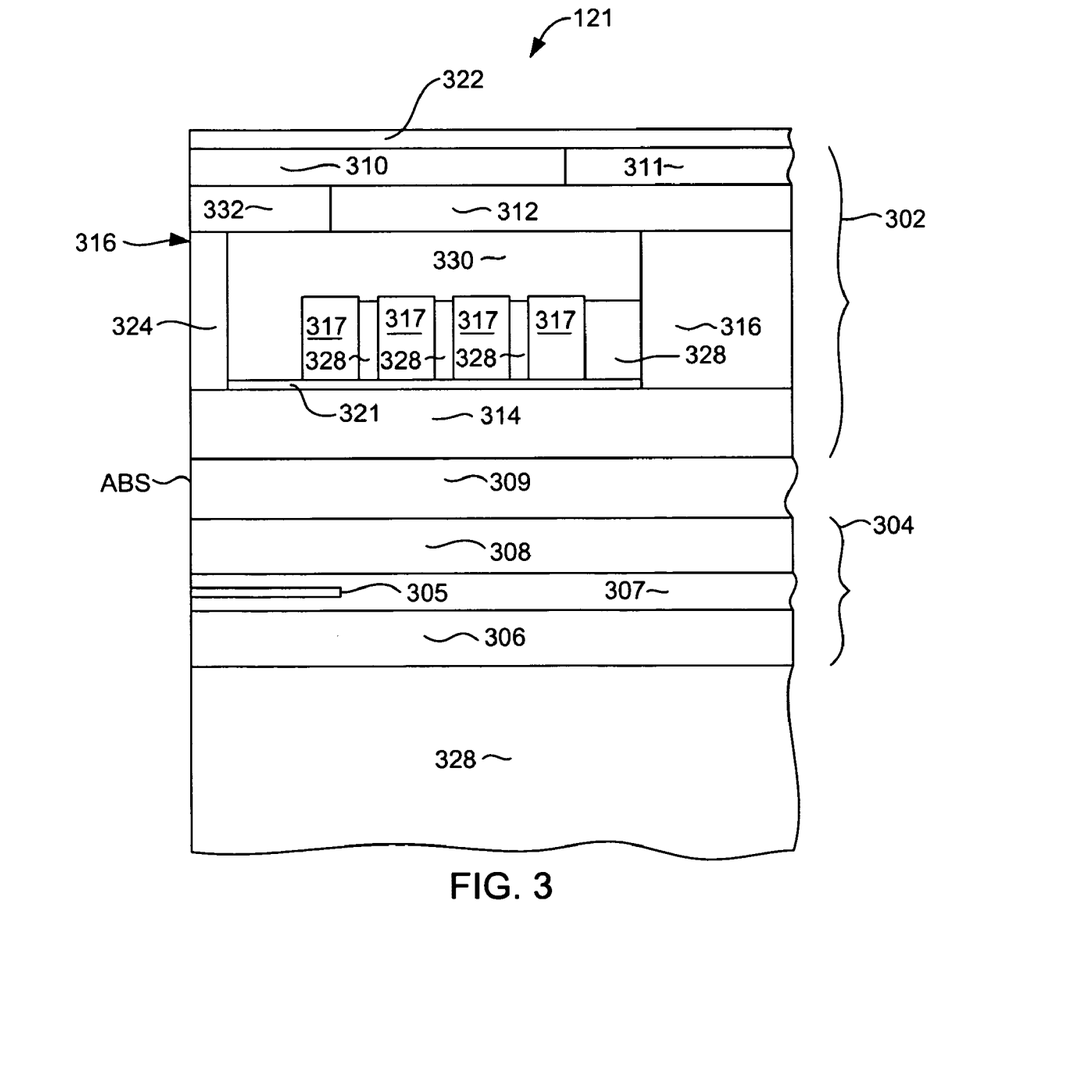
FIG. 3 is a cross sectional view of a magnetic head taken from line 3-3 of FIG. 2, enlarged, and rotated 90 degrees counterclockwise illustrating an embodiment of the invention incorporated into a perpendicular magnetic write head.

With reference now to FIG. 3, the magnetic head 121 for use in a perpendicular magnetic recording system is described. The head 121 includes a write element 302 and a read element 304. The read element 304 includes a magnetoresistive read sensor 305. The sensor 305, could be, for example, a current in plane giant magnetoresistive sensor (CIP GMR), a current perpendicular to plane giant magnetoresistive sensor (CPP GMR) or a tunnel junction sensor (TMR). The sensor 305 is located between first and second magnetic shields 306, 308 and embedded in a dielectric material 307. The magnetic shields 306, 308, which can be constructed of for example CoFe, NiFe or sendust, absorb magnetic fields, such as those from up-track or down-track data signals, ensuring that the read sensor 305 only detects the desired data track located between the shields 306, 308. A non-magnetic, electrically insulating gap layer 309 may be provided between the shield 308 and the write head 302. If the sensor 305 is a CIP GMR sensor, then the sensor will be insulated from the shields 306, 308 as shown in FIG. 3. However, if the sensor 305 is a CPP GMR sensor or TMR sensor, then, the top and bottom of the sensor 305 can contact the shields 306, 308 so that the shields can act as electrically conductive leads for supplying a sense current to the sensor 305.

With continued reference to FIG. 3, the write element 302 includes a write pole 310 that is magnetically connected with a magnetic shaping layer 312, and is embedded within an insulation material 311. The write pole 310 has a small cross section at the air bearing surface and is constructed of a magnetic material. The write head 302 also includes a return pole 314 that is constructed of a magnetic material such as CoFe or NiFe and has a cross section parallel to the ABS surface that is significantly larger than that of write pole 310. The return pole 314 is magnetically connected with the shaping layer 312 and write pole 310 by a back gap portion 316 as shown in FIG. 3. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. A hard, electrically insulating, protective layer 322, constructed of, for example alumina may be provided over the top of the head 121 to protect the head from damage from corrosion, abrasion, etc.

When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium (not shown). This magnetic field emitted from the write pole 310 magnetizes a relatively higher coercivity, thin, top magnetic layer on the magnetic medium (not shown in FIG. 3). This magnetic field travels through a magnetically soft underlayer of the magnetic medium to the return pole 314, where it is sufficiently spread out that it does not erase the signal written by the write pole 310.

With reference still to FIG. 3, the write head 302 may also include a magnetic shield or pedestal 324. This magnetic pedestal can be constructed of a magnetic material such as NiFe, CoFe, etc. and may be magnetically connected to the return pole. The pedestal 324 acts as a magnetic shield to prevent magnetic flux from the write coil 317 from reaching and affecting the magnetic medium (not shown).

The coil 317 is magnetically and electrically insulated from the return pole 314, back gap 316, shaping layer 312 and return pole. A bottom insulating layer 326 is provided beneath the write coil 317 to insulate the write coil 317 from the underlying return pole 314. A coil insulation layer 328 is fills the space between the turns of the coil 317 and fills the space between the coil 317 and back gap 316. This coil insulation layer is preferably constructed of a material that can easily be deposited into the small, high aspect ratio space between the turns of the coil 317. Therefore, the coil insulation layer 328 is preferably photoresist, which can be easily deposited into these small spaces between the coil turns and later hard baked. As can be seen however, the photoresist coil insulation layer 328 does not extend between the coil and the pedestal 324.

With continued reference to FIG. 3, an insulation fill layer 330 fills the space between the coil 317 and the pedestal 324 and may also fill the space above the coil 317, between the coil 317 and the shaping layer 312. An insulation layer 332 also fills the space between the shaping layer 312 and the ABS. This insulation layer 332 may integral with or distinct from the insulation fill layer 330. The insulation layer 332 is preferably constructed of alumina ($Al_2O_3$) as this provides a hard, durable surface for exposure at the ABS.

With reference still to FIG. 3, it can be seen the insulating fill layer 330 fills the space between coil 317 and the pedestal. The insulation fill layer is constructed of an electrically insulating, non-magnetic material having a relatively low thermal expansion coefficient. For example, an excellent material for the fill layer 330 would be alumina ($Al_2O_3$). This material has a low coefficient of thermal expansion, is hard, on non-magnetic, electrically conductive and readily available. It should be pointed out that the coil insulation layer 328, being constructed of photoresist, has a much higher coefficient of thermal expansion than the alumina fill layer 330. If this photoresist coil insulation layer were allowed to extend between the coil 317 and the pedestal 324, the thermal expansion of the photoresist coil insulation layer 328 would cause excessive mechanical stress on the pedestal 324. This stress would deform the pedestal (possibly plastically) causing the pedestal to protrude outward from the ABS. This protrusion of the pedestal 324 could then cause catastrophic contact with the disk (not shown) causing damage to the disk and damage to the head.

A more traditional coil fabrication scheme would apply the photoresist coil insulation layer such that it extends to the pedestal, using the pedestal 324 as a dam to define the front edge of the photoresist layer. However, according to the present invention, filling the space between the coil 317 and the pedestal 324 with a material having a low thermal expansion coefficient such as alumina greatly reduces thermal protrusion in the write head 302.

Figure 4:
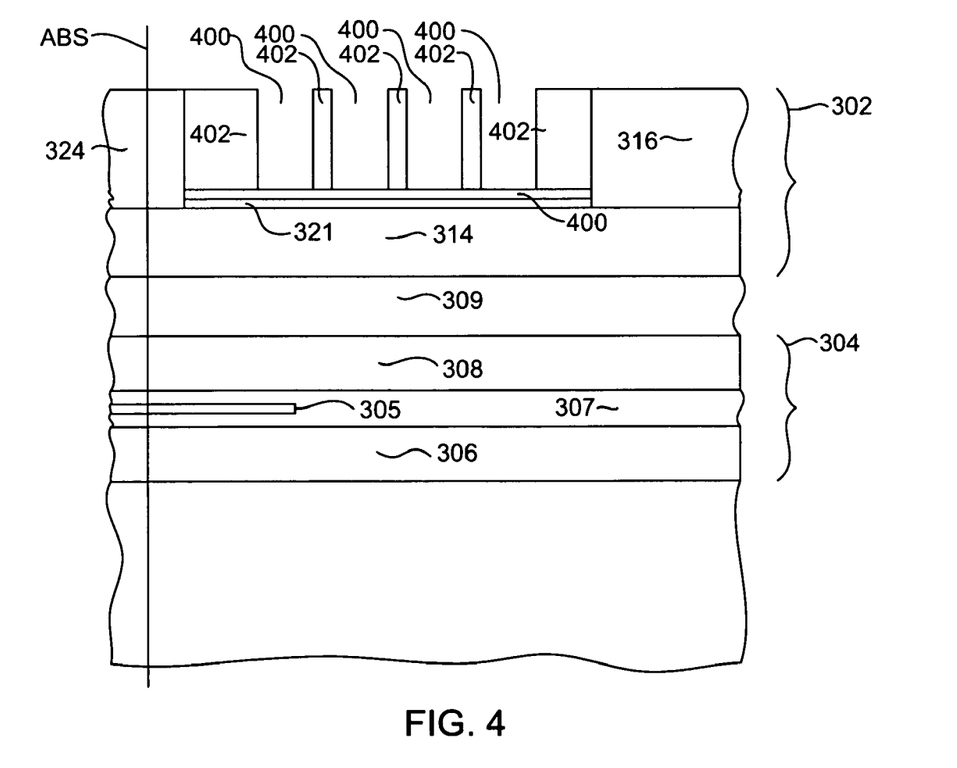
FIGS. 4-8 are cross sectional views of a magnetic write head in various intermediate stages of manufacture illustrating a method of manufacturing a magnetic write head according to an embodiment of the invention.

With reference now to FIGS. 4-8 a method for manufacturing a write head according to an embodiment of the invention is described. With particular reference to FIG. 4, with the read head 304 already constructed, the non-magnetic gap layer 309 is deposited and the return pole 314 is formed. The pedestal 324 and back gap 316 are then formed over the return pole 314.

A thin electrically insulating, non-magnetic layer 321, constructed of for example alumina, is deposited over the return pole 314. An electrically conductive coil seed layer 400 is deposited over the thin insulation layer 321. A photoresist mask 402 is formed having a trench 404 that defines a coil pattern (a portion of which is shown in cross section in FIG. 4. Although the air bearing surface (ABS) has not yet been formed, the location at which the ABS will be formed after lapping is indicated by the line denoted ABS.

Figure 5:
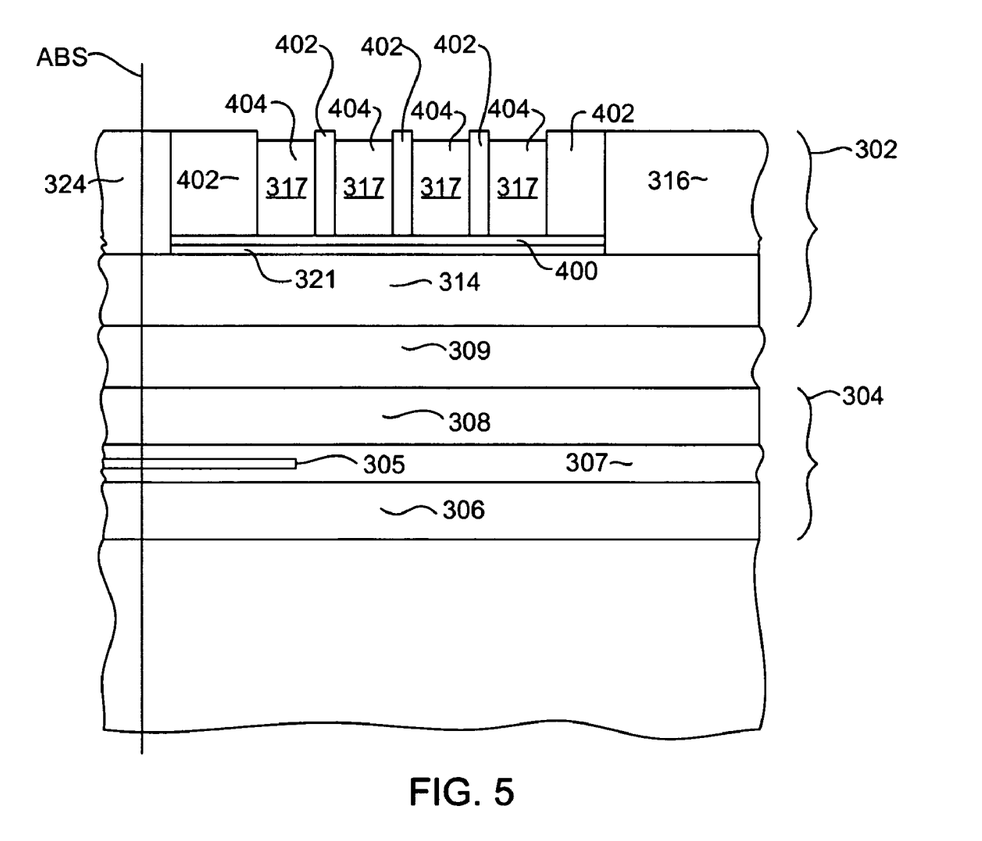

With reference to FIG. 5, an electrically conductive material such as Cu 317 is deposited into the trench 404 formed in the photoresist mask 402 to form the write coil 317. The electrically conductive material 317 can be deposited by electroplating using the electrically conductive seed layer 400 as an electroplating seed. The photoresist mask 402 is then removed, such as by chemical liftoff, and a short reactive ion etch (RIE) or ion mill can be performed to remove unwanted portions of the seed layer 400.

Figure 6:
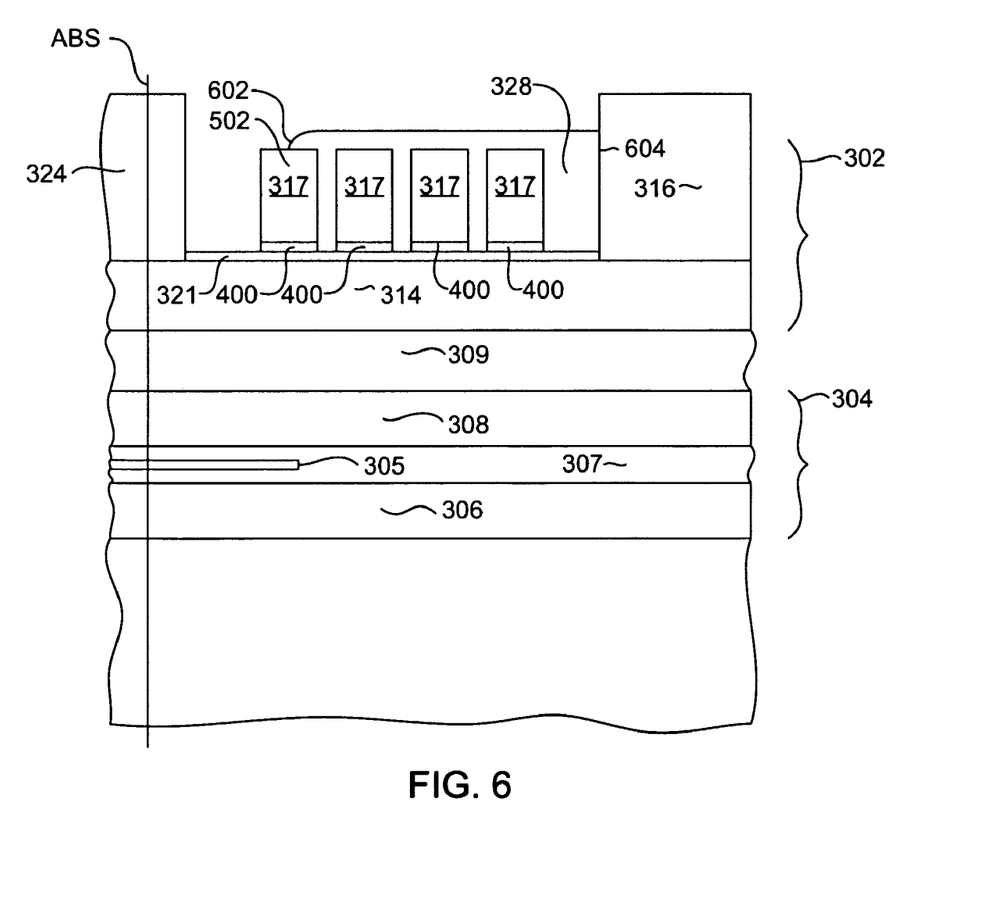
Figure 7:
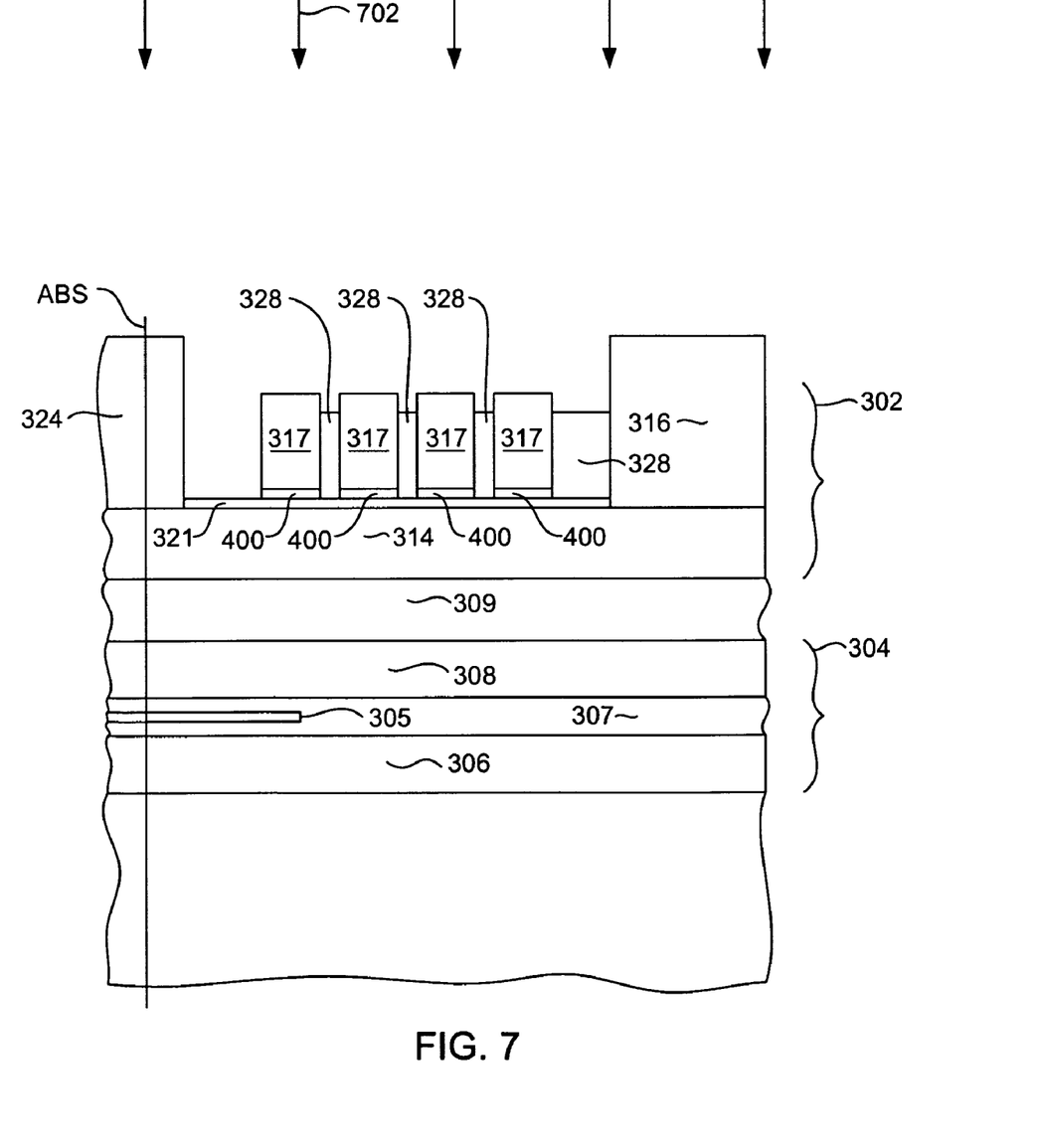
Figure 8:
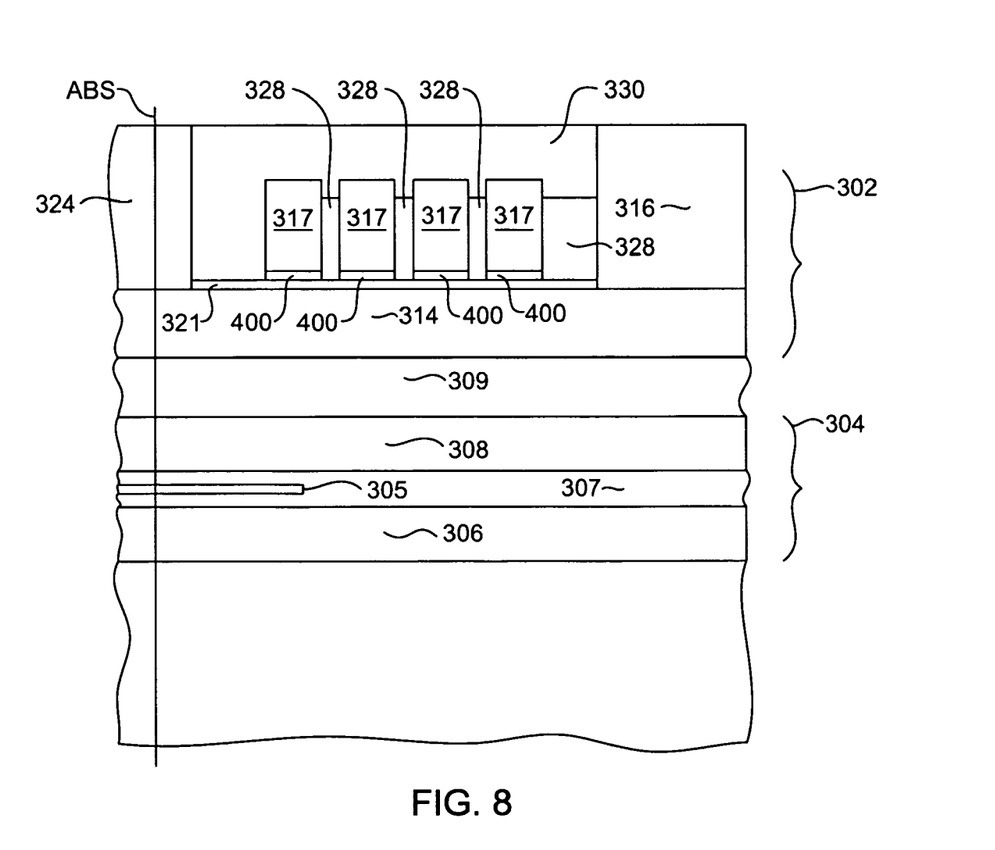

With reference now to FIG. 6 the photoresist coil insulation layer 328 is deposited. The coil insulation layer 328 is photolithographically patterned and developed such that the front edge 602 of the photoresist layer extends to a point somewhere near the outermost turn of the coil 317 nearest the pedestal 324. The other edge (back edge) 604 of the coil insulation layer 328 extends to the back gap 316. The photoresist coil insulation layer 328 is heated to hard bake the resist layer 328. Then, with reference to FIG. 7, a photoresist removal process such as a dry photoresist etch or reactive ion etch 702 is performed to remove upper portions of the photoresist coil insulation layer 328 until the top surface of the photoresist coil insulation layer is at a desired point beneath the top of the coil 317. The height of the photoresist coil insulation layer 328 is reduced to such a height that an alumina fill will be able to effectively fill the resulting space between the coil turns without leaving voids. Then, with reference to FIG. 8, an alumina ($Al_2O_3$) fill layer 330 is deposited to at least the height of the pedestal 324, and back gap 316. A chemical mechanical polish (CMP) can be performed to form a smooth coplanar surface across the tops of the back gap 316, alumina fill 330 and pedestal 324. The remaining structures such as the magnetic shaping layer 312, insulation layers 332, 311, write pole 310 and protective layer 322 can then be formed resulting in the structure described with reference to FIG. 3.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic data recording, the write head comprising:
    a magnetic return pole having a first end disposed toward an air bearing surface (ABS) and a second end opposite the first end;
    an electrically conductive write coil, having a plurality of coil turns, a portion of which passes over the return pole, the write coil being separated from the return pole by a non-magnetic, electrically insulating material;
    a layer of hard baked photoresist separating the coil turns from one another;
    a magnetic pedestal, magnetically connected with the return pole at the first end of the return pole and located at the ABS; and
    an alumina fill material disposed between the electrically conductive coil and the pedestal and between the electrically conductive coil and the ABS, the alumina fill material completely filling the space between the coil and the pedestal, such that there is no hard baked photoresist located between the coil and the pedestal and no hard baked photoresist between the coil and the ABS.

2. A magnetic write head for perpendicular magnetic recording, comprising:
    a magnetic write pole having an end disposed toward an air bearing surface (ABS);
    a return pole having an end disposed toward the ABS and an end opposite the ABS, the return pole being magnetically connected with the write pole in a region away from the ABS;
    a magnetic pedestal magnetically connected with the return pole at the end near the ABS and extending toward the write pole;
    an electrically conductive coil having a plurality of turns a portion of which pass over the return pole;
    an alumina fill layer disposed between the coil and the pedestal; and
    a photoresist coil insulation layer disposed between the turns of the coil;
    wherein the alumina fill layer completely fills a space between the coil and the pedestal and between the coil and the ABS, such that there is no photoresist between the coil and the pedestal and no photoresist between the coil and the ABS.

3. A magnetic write head as in claim 2 wherein the write coil is separated from the return pole by a thin layer of alumina.

4. A magnetic write head as in claim 2 wherein the alumina fill layer extends over the coil.

5. A magnetic write head as in claim as in claim 2 wherein the coil has an upper surface and wherein the photoresist coil insulation layer extends to a level below the top surface of the coil, and wherein the alumina fill layer extends over the coil and the coil insulation layer.

6. A magnetic write head for perpendicular magnetic recording, comprising:
    a magnetic write pole having an end disposed toward an air bearing surface (ABS);
    a magnetic shaping layer recessed from the ABS and magnetically connected with the write pole;
    a magnetic return pole having an end disposed toward the ABS and an end disposed away from the ABS;
    a magnetic back gap layer magnetically connecting the magnetic shaping layer with the magnetic return pole in a region away from the ABS;
    a magnetic pedestal magnetically connected with the return pole at the end disposed toward the ABS, the magnetic pedestal extending from the return pole toward write pole;
    an electrically conductive coil having a plurality of turns a portion of which pass between the back gap layer and the pedestal and between the return pole and the shaping layer;
    an alumina fill layer disposed between the coil and the pedestal; and
    a photoresist coil insulation layer disposed between the turns of the coil;
    wherein the alumina fill layer completely fills a space between the coil and the pedestal and between the coil and the ABS. such that there is no photoresist between the coil and the pedestal and no photoresist between the coil and the ABS.

7. A magnetic write head as in claim 6 wherein the photoresist coil insulation layer extends between the coil and the back gap layer.

8. A magnetic write head as in claim 6 wherein the pedestal is magnetically separated from the write pole.

9. A magnetic write head as in claim 6 wherein the alumina fill layer extends over the coil between the coil and the shaping layer.

10. A magnetic write head as in claim 6 wherein the alumina fill layer extends over the coil between the coil and the shaping layer and extends to the back gap layer.

11. A magnetic write head as in claim 6 wherein the write coil has an upper surface disposed toward the shaping layer, and wherein the photoresist coil insulation layer extends to a height below the upper surface of the write coil.

12. A magnetic write head as in claim 6 wherein:
    the write coil has an upper surface disposed toward the shaping layer;
    the photoresist coil insulation layer has an upper surface disposed toward the shaping layer that is recessed from the upper surface of the coil; and
    the alumina fill layer extends over the write coil and the photoresist coil insulation layer.

13. A magnetic write head as in claim 6 wherein:
    the write coil has an upper surface disposed toward the shaping layer; the photoresist coil insulation layer has an upper surface disposed toward the shaping layer that is recessed from the upper surface of the coil; and
    the alumina fill layer extends over the write coil and the photoresist coil insulation layer, the alumina fill layer contacting the upper surface of the coil and the photoresist insulation layer and extending to the back gap.

14. A magnetic write head for perpendicular magnetic recording, comprising:

a magnetic return pole having an end disposed at an air bearing surface (ABS);

a magnetic pedestal formed on and in magnetic contact with the return pole at the end disposed at the ABS;

an electrically conductive write coil having a plurality of turns;

a photoresist fill layer disposed between the turns of the coil; and a fill layer comprising an electrically insulating, non-magnetic material having a low coefficient of thermal expansion disposed between the coil and the pedestal, the fill layer completely filling the space between the coil and the pedestal and between the coil and the ABS, such that there is no photoresist between the coil and the pedestal and no photoresist between the coil and the ABS.

15. A write head as in claim 14 wherein the fill layer comprises alumina.

* * * * *